Patented Apr. 27, 1943

2,317,908

UNITED STATES PATENT OFFICE 2,317,908

DEODORANT

Roy I. Grady, Wooster, Ohio

No Drawing. Application March 14, 1941,
Serial No. 383,417

7 Claims. (Cl. 167—14)

The present invention relates to a composition of matter and more particularly to a deodorant.

Deodorants have been limited in their field of use because of the cost of producing them, their ineffectiveness to destroy extremely offensive odors, because of the deleterious effect they have upon animal life, etc. Accordingly, it is an object of this invention to provide a deodorant which is inexpensive to produce, non-caustic, non-poisonous to human or animal life and practically odorless.

After much experimentation I have found that this deodorant is effective to destroy odors arising from both inorganic and organic substances especially in zoos, hatcheries, stables, etc. where the odors are not localized, as well as garbage cans, etc. Also for removing animal odors especially from dogs and horses.

This composition has also been used successfully as a germicide in curing skin diseases of animals, such as mange; as a fungicide for curing diseases such as athletes foot; and many other uses will naturally suggest themselves to those persons skilled in this art.

In carrying out my invention, I combine natural marl with lime to form the deodorant substance.

The following example is illustrative of a preferred form of my invention:

6 parts, by weight, of marl; 1 part, by weight, of lime.

The chemical content of the marl contemplated in the present invention is substantially as follows:

|  | Per cent |
|---|---|
| Clay ($H_4Al_2Si_2O_9$) | 20 –45 |
| Sand ($SiO_2$) | 20 –45 |
| Chalk ($CaCO_3$) | 16 –40 |
| Iron oxide ($Fe_2O_3$) | ½–10 |
| Magnesium oxide (MgO) | ½– 3 |
| Potassium oxide ($K_2O$) | ½– 3 |
| Sodium oxide ($Na_2O$) | ½– 3 |
| Other ingredients | |

It is to be understood that the chemical composition of natural marl will vary somewhat depending upon the section of the country from which it is selected but I have successfully used marl, of the above composition, for all the purposes herein set forth.

The following example is illustrative of another form of this invention:

5 to 90 parts, by weight, of marl; 1 part, by weight, of lime.

The marl used in the above examples is preferably a sun dried natural marl rather than a kiln dried or wet marl. However, for some purposes depending upon use, a kiln dried or wet marl may be more advantageous.

The lime used in the above examples may be either slaked or unslaked, and produces an activating effect in the deodorant.

The amount of the deodorant composition to be used to obtain effective results will naturally vary. When used in deodorizing animal cages, the kind of floor, species of animal etc. are conditions precedent to volumetric estimation.

For cleaning the floor of an animal's cage, the dry deodorant composition may be sprinkled on the floor, or else the deodorant may be wetted before being deposited on the floor. The wet composition is used by mixing approximately one-third of a pound of the deodorant with two gallons of water. Preferably, the deodorant is placed in a receptacle and the water added through a hose in a manner to thoroughly mix the water and deodorant, pursuant to which the admixed water and deodorant are washed over the floor to be cleaned before the solid has a chance to settle. The residual composition may be left on the floor or removed, in a few minutes, at the option of the user. If desired, the deodorant in dry form may be put on the floor of the cage and allowed to remain until the litter is removed.

In its broadest concept this invention embraces a deodorant composition comprising an admixture of natural marl and lime in such quantities as to provide a deodorant, a germicide and a fungicide which are non-caustic and non-poisonous.

The examples of the invention set out above are only for the purpose of illustration, and it is to be understood that the scope of this invention is not to be limited thereby.

I claim:

1. A deodorant composition comprising natural marl and lime.

2. A deodorant composition comprising 6 parts by weight of a natural marl and 1 part by weight of lime.

3. A deodorant composition comprising 5 to 90 parts by weight of natural marl and 1 part by weight of lime.

4. A deodorant composition comprising natural marl and a minor portion of lime to provide a non-caustic, non-poisonous, and substantially odorless composition.

5. For use in a composition of matter the admixture of natural marl, of predetermined contents, and lime, for use as a deodorant, germicide and fungicide.

6. A deodorant comprising marl, of predetermined composition, and lime, the latter being present in considerably lesser proportion.

7. A wet deodorant comprising a composition of natural marl and lime, and water for admixture with the composition in the approximate proportions of 24 parts of water to 1 part of the composition.

ROY I. GRADY.